(12) United States Patent
Behi et al.

(10) Patent No.: US 8,916,088 B2
(45) Date of Patent: Dec. 23, 2014

(54) METAL, CERAMIC AND CERMET ARTICLES FORMED FROM LOW VISCOSITY AQUEOUS SLURRIES

(76) Inventors: Mohammad Behi, Lake Hiawatha, NJ (US); Alexander Lobovsky, Westfield, NJ (US)

( * ) Notice: Subject to any disclaimer, the term of this patent is extended or adjusted under 35 U.S.C. 154(b) by 176 days.

(21) Appl. No.: 13/488,487

(22) Filed: Jun. 5, 2012

(65) Prior Publication Data
US 2012/0288653 A1    Nov. 15, 2012

Related U.S. Application Data

(62) Division of application No. 12/807,327, filed on Sep. 2, 2010, now Pat. No. 8,216,691, which is a division of application No. 11/339,746, filed on Jan. 25, 2006, now Pat. No. 7,615,184.

(51) Int. Cl.
| | | |
|---|---|---|
| *B05D 7/22* | (2006.01) | |
| *C04B 38/06* | (2006.01) | |
| *B22F 3/11* | (2006.01) | |
| *C04B 20/00* | (2006.01) | |
| *C04B 41/00* | (2006.01) | |
| *C04B 41/51* | (2006.01) | |
| *C04B 41/88* | (2006.01) | |
| *C22C 1/08* | (2006.01) | |
| *C08J 9/40* | (2006.01) | |
| *C04B 111/00* | (2006.01) | |

(52) U.S. Cl.
CPC ........... *C04B 38/0615* (2013.01); *B22F 3/1121* (2013.01); *C04B 20/0056* (2013.01); *C04B 41/009* (2013.01); *C04B 41/51* (2013.01); *C04B 41/88* (2013.01); *C22C 1/08* (2013.01); *C08J 9/40* (2013.01); *B22F 2998/10* (2013.01); *C04B 2111/00198* (2013.01); *C04B 2111/00793* (2013.01); *C04B 2111/00836* (2013.01); *C08J 2201/038* (2013.01)
USPC ........... 264/628; 264/621; 264/643; 264/603; 264/317; 419/65

(58) Field of Classification Search
USPC ............. 264/621, 628, 643, 603, 317; 419/65
See application file for complete search history.

(56) References Cited

U.S. PATENT DOCUMENTS

| | | | | |
|---|---|---|---|---|
| 4,846,906 | A * | 7/1989 | Helferich et al. | 156/89.28 |
| 5,126,082 | A * | 6/1992 | Frank | 264/28 |
| 5,279,994 | A * | 1/1994 | Kerkar | 501/94 |
| 5,640,669 | A * | 6/1997 | Harada et al. | 428/552 |
| 6,126,888 | A * | 10/2000 | Goldstein | 264/610 |
| 7,799,251 | B2 * | 9/2010 | Therriault et al. | 264/49 |
| 8,216,691 | B2 * | 7/2012 | Lobovsky et al. | 428/613 |
| 2009/0081363 | A1 * | 3/2009 | Lobovsky et al. | 427/193 |
| 2011/0311635 | A1 * | 12/2011 | Stucky et al. | 424/490 |
| 2012/0183799 | A1 * | 7/2012 | Steele et al. | 428/550 |
| 2014/0193661 | A1 * | 7/2014 | Steele et al. | 428/613 |

OTHER PUBLICATIONS

Behi, Mohammad, High Solid loading aqueous base metal/ceramic feedstock for injection molding, (2001), pp. 1-107.*

* cited by examiner

*Primary Examiner* — Matthew Daniels
*Assistant Examiner* — Nahida Sultana
(74) *Attorney, Agent, or Firm* — Sheldon Kavesh (57) ABSTRACT

Metal, ceramic and cermet hollow articles produced from low viscosity suspensions. The articles are useful for filters, catalyst media, fuel cell electrodes, body implantation devices, structural materials, vibration and noise control, heat exchangers, heat sinks, heat pipes, heat shields and other applications.

2 Claims, 5 Drawing Sheets

METAL, CERAMIC AND CERMET ARTICLES FORMED FROM LOW VISCOSITY AQUEOUS SLURRIES

CROSS-REFERENCE TO RELATED APPLICATIONS

This is a divisional application under 35 U.S.C. 121 of application Ser. No. 11/339,746 filed Jan. 25, 2006, now U.S. Pat. No. 7,615,184 B2. It is related to pending divisional application Ser. No. 12/807,327 filed Sep. 2, 2010 arising from the same parent application.

BACKGROUND OF THE INVENTION

1. Field of the Invention

This invention relates to a process for producing metal, ceramic and cermet articles from low viscosity suspensions and the articles produced thereby. The articles include micro diameter hollow fibers, tubes having hollow walls, solid and hollow sheets, and open cell foams. The articles are useful for filters, catalyst media, fuel cell electrodes, body implantation devices, structural materials, vibration and noise control, heat exchangers, heat sinks, heat pipes, heat shields and other applications.

2. Description of the Related Art

U.S. Pat. No. 4,268,278 described a method of preparing inorganic hollow fibers by first forming a polymeric precursor hollow fiber laden with the inorganic material, removing the polymer and sintering the inorganic material. The hollow fiber had a radially anisotropic void volume wall structure.

U.S. Pat. Nos. 5,011,566 and 5,298,298 described a method of preparing a microscopic tube by first depositing a oxidation resistant material on the surface of an oxidizable fiber, preferably by chemical vapor deposition, said deposition occurring in an inert environment. The coated fibers were placed in an oxidizing environment and the base fiber was removed by oxidation, the remaining coating forming a hollow tube.

U.S. Pat. No. 5,352,512 described a method of preparing a microscopic tube by first depositing a solvation resistant material on the surface of an dissolvable fiber, preferably by chemical vapor deposition, said deposition occurring in an inert environment. The coated fibers were placed in a solvating environment and the base fiber was removed, the remaining coating forming a hollow tube.

U.S. Pat. No. 6,194,066 described microscopic tubes having porous walls or multi-layer walls prepared by methods similar to those described in U.S. Pat. Nos. 5,011,566, 5,298, 298 and 5,352,512.

U.S. Pat. No. 6,458,231 described methods of manufacturing microtubes that had peripheral geometries that were not uniform along the tube axis.

Methods for the preparation of porous ceramic bodies through coating of foam substrates with slurries of ceramic particles have been described for example in U.S. Pat. Nos. 3,090,094, 3,097,930, 3,893,917, 3,893,917, 3,947,363, 3,962,081, 3,993,495, 4,004,933, 4,024,212, 4,056,586, 4,075,303, 4,113,241, 4,154,689, 4,158,684, 4,265,659, 4,343,704, 4,610,832, 4,803,025, 4,833,106, 4,866,011, 4,885,263, 4,923,830, 4,975,191, 5,039,340, 5,177,035, 5,185,297, 5,429,780, 5,676,833, 5,705,118, 6,426,163, 6,932,925 and United States Patent Application 20040077480.

These prior art methods were limited in the combination of pore density and body thickness that could be achieved: U.S. Pat. Nos. 4,056,586 and 3,893,917 reported that the maximum body thickness that could be achieved at a pore density of 100 pores/in (39.37 pores/cm) was 10 cm. In U.S. Pat. No. 4,075,303 using a slurry viscosity of 1,000 to 80,000 centipoises (1 to 80 Pa-s), the maximum pore density that could be achieved at a thickness of 10 cm was 25-35 pores/in (9.84-13.78 pores/cm).

Methods for the preparation of porous metal or inorganic bodies through coating of foam substrates with slurries of metal particles or inorganic particles have similarly been described for example in U.S. Pat. Nos. 3,111,396, 3,408,180, 3,946,039, 4,560,621, 5,640,669, 5,881,353, 5,951,791, 6,399,528, 6,387,149, 6,524,522, 6,706,239, 6,840,978 B2, and Japanese Kokai Patent Publication JP6271904. JP6271904 described use of low viscosity slurries of metal particles in liquid phenolic resins.

The maximum body thickness that could be achieved with slurries of metal particles was reported in U.S. Pat. No. 5,640, 669 to be 0.25 cm at a pore density of 50 pores/in (19.69 pores/cm).

By way of further background, the penetration of porous media by pure liquids is sensitive to the viscosity of the liquid as expressed by the Lucas-Washburn equation. To with, $$x^2 = \frac{\sigma r \cos\theta}{2\mu} t$$

where x is the distance penetrated by the liquid, $\sigma$ is the surface tension of the liquid, $\mu$ is its viscosity, $\theta$ is the contact angle between the liquid and the surface of the capillary, r is the radius of the capillary and t is the penetration time. (Ref.: Marmur et al., "Characterization of Porous Media by the Kinetics of Liquid Penetration: The Vertical Capillaries Model", J. Colloid and Interface Sci., 199 299-304 (1997)). This sensitivity of penetration distance to viscosity appears not to have been recognized in the prior art cited above for preparing porous inorganic bodies by coating foam substrates.

Each of the prior art methods represented progress toward the goals to which they were directed. However, none described the specific methods or articles of this invention and none recognized the problem and satisfied all of the needs met by this invention. Prior art methods of producing hollow metal fibers produced fibers with radially anisotropic walls or they were limited in the length of the fibers that could be produced with impervious walls of uniform radial composition. A need exists for hollow metal fibers having isotropic impervious walls of uniform radial composition. Further, a need exists for continuous hollow metal fibers of indefinite length.

Prior art methods of producing porous metal or ceramic articles using slurries were limited in their ability to produce both high pore density and thick sections simultaneously. Some prior art methods used solvents that adversely affected the environment and/or left carbon residue in the final article. Prior art processes seem not to have produced continuous articles of indefinite length. A need exists for porous metal and inorganic articles that have high pore density in thick sections and are made using environmentally benign materials. A need exists for continuous porous metal and polycrystalline ceramic articles of indefinite length. Further, a need exists for metal and ceramic meshes, tubes and sheets having hollow walls. Other needs satisfied by the invention are improved methods of making metal foils, the foils thereby produced, and methods of making an inorganic coating on an inorganic substrate.

SUMMARY OF THE INVENTION

This invention comprises processes for producing metal, ceramic and cermet articles from low viscosity suspensions and the articles produced thereby. In a first embodiment, the invention is a method for making a hollow article comprising the steps:
  a) selecting a polymeric substrate from the group consisting of a filament, a plurality of essentially parallel filaments, a woven fabric sheet, a knitted fabric sheet, a non-woven fabric sheet, a mesh, a film, a sheet, and an open cell foam, said polymeric substrate having exterior surfaces and optionally having interior surfaces;
  b) coating said exterior and interior surfaces, if any, of said substrate with an aqueous slurry comprising a gel forming binder and inorganic particles, said inorganic particles being at least one member of the group consisting of a ceramic powder, a metal powder, a cermet powder, carbon nanontubes, metal whiskers, ceramic whiskers, or their mixture to form a coated article, said slurry being applied at a temperature above its gelation temperature and having a viscosity at most 0.4 Pa-sec at the application temperature;
  c) optionally, removing excess slurry from the coated article;
  d) cooling said slurry to a temperature below its gelation temperature;
  e) substantially drying the coated article;
  f) optionally repeating steps b) through e) one or more times;
  g) heating the coated article for periods of times, at temperatures and in atmospheres sufficient to vaporize the polymeric substrate forming a green hollow article;
  h) sintering the green hollow article in a protective atmosphere under conditions of time and temperatures as are required to cohere the inorganic particles into a unitary hollow article having interior surfaces with essentially the initial form of the vaporized substrate.

In a second embodiment, the invention is a hollow article produced by the above method.

In a third embodiment, the invention is an open cell metal foam article comprising a multiplicity of hollow structural members, the external surfaces of said structural members defining connected pores, the number of pores per centimeter in at least one direction satisfying the following inequality:

$$(55-8.27\ L) \leq Pores/cm \leq (140-8.27\ L)$$

wherein L is the minimum dimension of said article selected from its length, width, or thickness measured in centimeters.

In a fourth embodiment, the invention is an open cell inorganic hollow foam article selected from the group consisting of a metal foam, a ceramic foam and a cermet foam, said foam comprising a multiplicity of hollow structural members, the external surfaces of said structural members defining connected pores, the number of pores in at least one direction satisfying the following inequalities:

$$(55-1.3\ L) \leq Pores/cm \leq (140-1.3\ L)$$

$$Pores/cm \geq 42$$

wherein L is the minimum dimension of said article selected from its length, width, or thickness, measured in centimeters.

In a fifth embodiment, the invention is an inorganic hollow article comprising a material selected from the group consisting of a metal, a ceramic and a cermet or their combination, said article having a density at least 50% of the density of the material of which said article is composed, said article having internal walls defining a network of interconnected channels, said channels permitting the passage of fluids, and said channel volume being from 0.1% to 30% of the total volume of said article.

In a sixth embodiment, the invention is an inorganic hollow mesh article selected from the group consisting of a metal mesh, a ceramic mesh and a cermet mesh, said mesh comprising a multiplicity of hollow structural members, the external surfaces of said structural members defining the boundaries of openings in said mesh.

In a seventh embodiment, the invention is an inorganic hollow sheet article selected from the group consisting of a hollow metal sheet, a hollow ceramic sheet, and a hollow cermet sheet, said article comprising upper and lower integrally connected sheet members, said upper and lower sheet members defining the boundaries of at least one interior open volume.

In an eighth embodiment, the invention is an inorganic hollow fiber of comprising at least one member of the group consisting of a metal, a polycrystalline ceramic, a cermet or their mixture, said fiber having one or more inner surfaces separated by impervious walls from one another and from an outer surface, said inner surfaces defining one or more continuous longitudinal channels along the length of the fiber, said walls being of isotropic structure, and said walls having uniform composition in the radial direction.

In a ninth embodiment, the invention is a method of making a metal foil comprising the steps:
  a) coating one surface of a substrate with an aqueous slurry comprising a gel forming binder and a metal powder, said slurry being applied at a temperature above its gelation temperature and having a viscosity less than or equal to 0.4 Pa-sec at the application temperature;
  b) cooling said slurry to a temperature below its gelation temperature to form a gel;
  c) substantially drying the gel to form a green foil body;
  d) optionally, separating the green foil body from the substrate;
  e) heating the green foil body for periods of times, at temperatures, and in atmospheres sufficient to sinter the green foil body into body into a dense metal foil, and optionally to vaporize the substrate.

In a tenth embodiment, the invention is a method of making an inorganic coating on an inorganic substrate comprising the steps:
  a) coating at least one surface of said substrate with an aqueous slurry comprising a gel forming binder and least one member of the group consisting of a ceramic powder, a metal powder, a cermet powder, carbon nanontubes, metal whiskers, ceramic whiskers, or their mixture to form a coating on the substrate, said slurry being applied at a temperature above its gelation temperature and having a viscosity less than or equal 0.4 Pa-sec at the application temperature;
  b) optionally, removing excess slurry from the substrate;
  c) cooling said slurry to a temperature below its gelation temperature;
  d) substantially drying the coated substrate;
  e) heating the coated substrate for periods of times, in atmospheres, and at temperatures below the melting point of said substrate sufficient to sinter the coating and the substrate into a unitary article.

DETAILED DESCRIPTION OF THE INVENTION

The invention comprises processes for producing metal, ceramic and cermet articles from low viscosity suspensions and the articles produced thereby. The articles of the invention possess novel structures.

As has been noted above, the penetration of porous media by pure liquids is sensitively enhanced by lower viscosity of the liquid. However, another issue faced by the skilled man seeking to coat a foam with a slurry is that slurry stability and homogeneity is enhanced by higher viscosity of the liquid medium. Thus, a conflict exists between ability to penetrate thick sections of a foam and the stability and homogeneity of slurries. This conflict is resolved in the present invention by use of gel-forming aqueous liquid media of very low viscosity that permit high but yet uniform penetration of porous bodies.

In a first embodiment, the invention is a method for making a hollow article comprising the steps:
a) selecting a polymeric substrate from the group consisting of a filament, a plurality of essentially parallel filaments, a woven fabric sheet, a knitted fabric sheet, a non-woven fabric sheet, a mesh, a film, a sheet, and an open cell foam, said polymeric substrate having exterior surfaces and optionally having interior surfaces;
b) coating said exterior and interior surfaces, if any, of said substrate with an aqueous slurry comprising a gel forming binder and inorganic particles, said inorganic particles being at least one member of the group consisting of a ceramic powder, a metal powder, a cermet powder, carbon nanontubes, metal whiskers, ceramic whiskers, or their mixture to form a coated article, said slurry being applied at a temperature above its gelation temperature and having a viscosity less than or equal to 0.4 Pa-sec at the application temperature;
c) optionally, removing excess slurry from the coated article;
d) cooling said slurry to a temperature below its gelation temperature;
e) substantially drying the coated article;
f) optionally repeating steps b) through e) one or more times;
g) heating the coated article for periods of times, at temperatures and in atmospheres sufficient to vaporize the polymeric substrate forming a green hollow article;
h) sintering the green hollow article in a protective atmosphere under conditions of time and temperatures as are required to cohere the inorganic particles into a unitary hollow article having interior surfaces with essentially the initial form of the vaporized substrate.

For the purposes of the invention, a gel is a substance consisting of at least 25 vol. % liquid that can resist a small shearing force without flowing. A gel forming binder is a substance that can be dispersed in a liquid at a first temperature, and when this dispersion is cooled to a second temperature termed the gelation temperature, the dispersion becomes a gel.

The polymeric substrate may be of any length and the article of the invention may be prepared in a batch mode or in a continuous mode. Preferably, the polymeric substrate is a continuous substrate of indefinite length passing continuously through an apparatus in which steps b) through e) of the above embodiment are carried out to form a continuous dried coated article of indefinite length, and this continuous dried coated article is passed continuously through an apparatus in which steps g) through h) of the above embodiment are carried out to form a continuous unitary hollow article of indefinite length having interior surfaces with essentially the initial form of the vaporized substrate.

Figure 1:
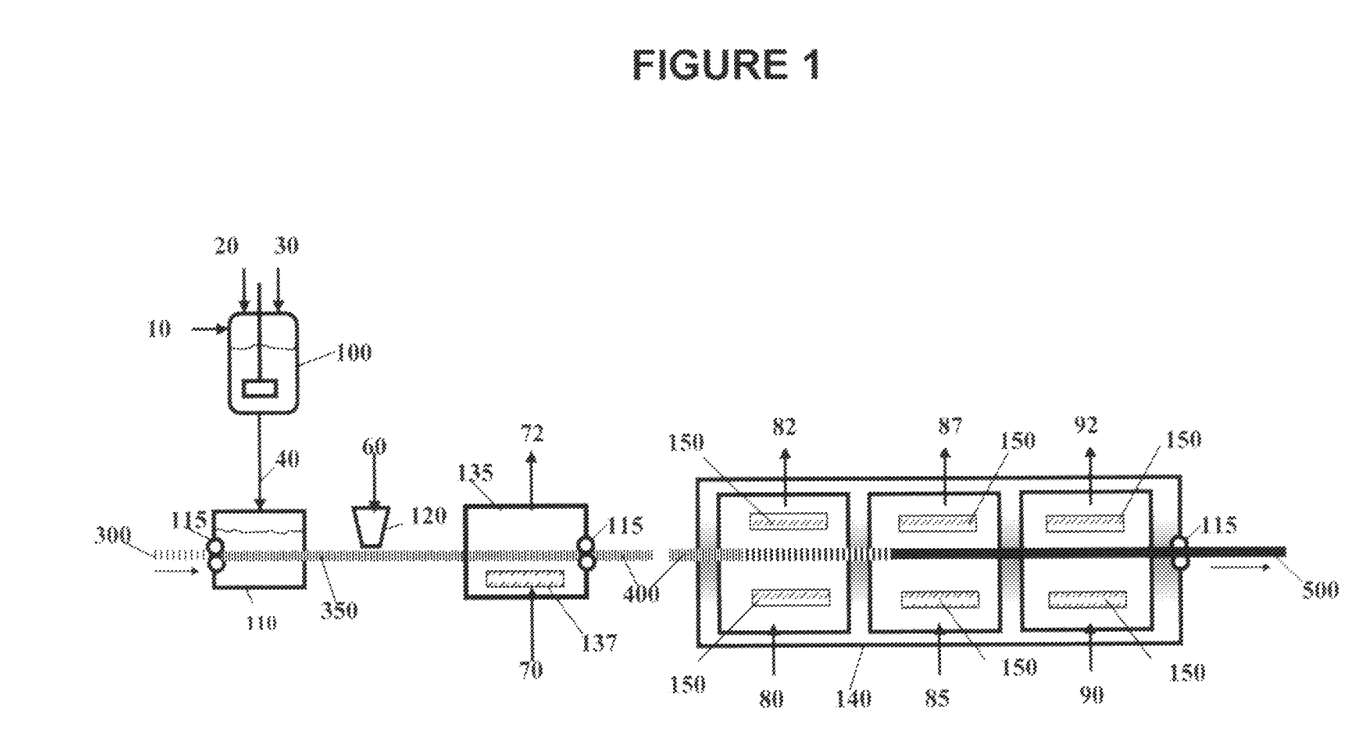
FIG. 1 is schematic diagram of a process for producing continuous articles of the invention of indefinite length.

The continuous process is illustrated schematically in FIG. 1. Water 10, inorganic particles 20 and other constituents such as defoaming agents and surfactants 30 are fed to an agitated vessel 100 in which a slurry is prepared having a viscosity of at most 0.4 Pa-s. The slurry 40 is fed to an immersion tank 110 to maintain a level in the tank above the level of a pair of rolls 115. The slurry in the immersion tank is agitated to maintain homogeneity. A polymeric substrate 300 is fed continuously into the immersion tank 110 by means of the rolls 115. The polymeric substrate 350 issuing from the immersion tank 110 has its exterior surface and interior surfaces coated by the slurry. Seals (not shown) prevent leakage of the slurry from the tank. The coated polymeric substrate 350 is then passed into an oven 135 with heating element 137 through an air stream 70, 72 to substantially dry water from the substrate. The dried-coated polymeric substrate 400 may be collected as a continuous article of indefinite length for further processing at a later time, or it may be passed immediately into a multi-compartment oven 140 (illustrated) or a series of separate ovens (not illustrated).

The multi-compartment oven 140 provides separate temperature zones by means of individually controlled internal heaters 150 and each compartment is provided with its own gas 80, 85, 90 or vacuum 82, 87, 92 connections so as to provide different chemical atmospheres or vacuum. Seals between compartments permit continuous passage of the coated polymeric substrate from compartment to compartment. The last compartment may be operated as a cool down zone.

The continuous dried coated polymeric substrate of indefinite length 400 passes through the multi-compartment oven at a speed (residence time), and at temperatures and in atmospheres sufficient first to vaporize the polymeric substrate leaving a green inorganic body, and then sufficient to sinter the green inorganic body into a continuous unitary article of indefinite length 500 having impervious structural members.

The following comments apply to both a batch mode and a continuous mode of this embodiment.

The method of coating the polymeric substrate with the slurry of inorganic particles may be by impregnation, immersion, painting, printing, or a combination of these or other methods.

After coating the polymeric substrate, excess slurry is optionally removed from the coated article by any practicable means. Excess slurry may be removed from the substrate, for example, by blowing with a high velocity gas stream, by squeezing, by squeegeeing, by applying a squeezing rolling pressure, by applying a vacuum, or by centrifugation.

Among the differences of the inventive process from the prior art is the use of aqueous slurries that are gel forming and of very low viscosity. These differences permit the production of green articles that are robust and flexible and sintered articles with generally thinner structural members and/or with larger transverse dimensions. Other advantages include simplicity and ease of production and use of environmentally benign materials. Still other advantages will become evident.

Preferably, the aqueous slurry of inorganic particles has a viscosity less than 0.1 Pa-sec and most preferable less than 0.04 Pa-sec at the application temperature. The viscosity of the aqueous slurry depends upon the solids content of the slurry, the shape and density of the inorganic particles, the type and concentration of the gel-forming binder and the temperature of the slurry. The skilled man can readily adjust these parameters to obtain a slurry viscosity less than or equal to 0.4 Pa-s. For example, Table I below shows the relationship of slurry viscosity to solids content for aqueous slurries of type 316 stainless steel powder (Grade PF-3F from Atmix Corp. and distributed by U.S. Bronze Co., Flemington, N.J.) having an average particle size of 3 microns. The slurries in Table I were prepared by dissolving gelatin in water at 30° C., then adding the stainless steel powder with agitation until the slurry consisted of 85.5 wt. % stainless steel powder, 13.5 wt. % water, and 1 wt. % gelatin (Type A Gelatin supplied by Gelita North America, Sergeant Bluff, Iowa). Additional water was then added to the slurry in steps to bring the solids content down with the slurry viscosity measured at each step. Slurry viscosities were measured at 25° C. Gelation temperature of the slurry was 22° C.

TABLE I

Viscosity of 316 Stainless Steel Aqueous Slurries

| Wt. % 316 SS Powder | Wt. % gelatin | Slurry Viscosity, Pa·-s |
|---|---|---|
| 85.5 | 1.0 | 0.4 |
| 80 | 0.936 | 0.09 |
| 75 | 0.877 | 0.025 |
| 68 | 0.795 | 0.01 |

Preferably, the application temperature of the coating is less than 80° C., more preferably less than 60° C., and most preferably less than 40° C. The application temperature is above the gelation temperature of the slurry. Preferably, the gelation temperature of the slurry is above about 20° C.

The gel forming binder is preferably at least one selected from the group consisting of agaroids, proteins, starches, polysaccharides, methyl cellulose, polyvinyl alcohol, polyacrylamide, and mixtures thereof. More preferably, the gel forming binder is gelatin or Kappa-carrageenan.

Preferably, the concentration of the gel forming binder in the aqueous slurry is from 0.3% to 10% of the total weight of the slurry.

Preferably, the inorganic particles are selected from the group consisting of carbides, oxides, nitrides, borides and silicides of metals, nonmetals, and mixtures thereof.

Alternatively, it is preferred that the inorganic particles are selected from the group consisting of pure metals, ferrous and non-ferrous alloys, intermetallic compounds and mixtures thereof. More preferable are metal particles selected from the group consisting of chromium, cobalt, copper, gold, iron, lead, manganese, molybdenum, nickel, niobium, palladium, platinum, rhodium, silver, tin, titanium, tungsten, vanadium, zinc and their alloys. Most preferred are metal particles selected from the group consisting of type 316 stainless steel, alloy 17-4PH, titanium carbide, tungsten carbide, tungsten-copper alloys and molybdenum-copper alloys.

Preferably, the aqueous slurry additionally comprises about 0.05 to about 1.2 percent by weight of water of a corrosion inhibitor selected from the group consisting of sodium chromate, magnesium chromate, potassium chromate, sodium silicate, potassium silicate, potassium nitrite and sodium nitrite. Additionally, the aqueous slurry may include biocides, defoaming agents, wetting agents, thickening agents and other materials commonly incorporated in slurries or suspensions.

Excess slurry is optionally removed from the coated polymeric substrate. This may be accomplished, for example, by blowing with a high velocity air stream, by squeegeeing, by applying a rolling pressure or passing through nip rolls. FIG. 1 illustrates the option of passing the coated polymeric substrate under a high velocity air knife 120 fed by an air stream 60 to remove excess slurry. A catch basin (not shown) collects the excess slurry.

In a second embodiment, the invention is a hollow article produced by the above method in either a continuous or batch mode. When the polymeric substrate is a filament, the article formed by the above process is a thin wall hollow fiber. When the polymeric substrate is a plurality of essentially parallel filaments, the article formed is a hollow body having a plurality of continuous channels. When the polymeric substrate is a woven, knitted or non-woven fabric sheet or a mesh, the article formed may be a mesh having thin wall hollow structural members or a hollow sheet depending on whether the openings of the fabric are filled by the slurry. When the polymeric substrate is a film or a sheet, the article formed is a hollow film or sheet having thin walls. When the polymeric substrate is an open cell foam, the article formed is a porous material having hollow thin wall structural members. Preferably, the hollow article is one selected from the group consisting of a foam, a fiber, a mesh and a sheet.

In a third embodiment, the invention is an open cell metal foam article comprising a multiplicity of hollow structural members, the external surfaces of said structural members defining connected pores, the number of pores per centimeter in at least one direction satisfying the following inequality:

$$(55-8.27\,L) \leq \text{Pores/cm} \leq (140-8.27\,L) \qquad \text{Eq. 1}$$

wherein L is the minimum dimension of said article selected from its length, width, or thickness measured in centimeters. Preferably, the number of pores per centimeter in at least one direction satisfies the following inequality:

$$(60-8.27\,L) \leq \text{Pores/cm} \leq (120-8.27\,L) \qquad \text{Eq. 2}$$

Preferably, the metal comprising the open cell metal foam article is selected from the group consisting of pure metals, ferrous and non-ferrous alloys, intermetallic compounds and mixtures thereof. More preferably, the metal comprising the article is selected from the group consisting of chromium, cobalt, copper, gold, iron, lead, manganese, molybdenum, nickel, niobium, palladium, platinum, rhodium, silver, tin, titanium, tungsten, vanadium, zinc and their alloys. Most preferably, the metal comprising the articles is selected from the group consisting of type 316 stainless steel, alloy 17-4PH, titanium carbide, tungsten carbide, tungsten-copper alloys and molybdenum-copper alloys.

In a fourth embodiment, the invention is an open cell inorganic hollow foam article selected from the group consisting of a metal foam, a ceramic foam and a cermet foam, said foam comprising a multiplicity of hollow structural members, the external surfaces of said structural members defining connected pores, the number of pores in at least one direction satisfying the following inequalities:

$$(55-1.3L) \leq \text{Pores/cm} \leq (140-1.3L) \qquad \text{Eq. 3a}$$

$$\text{Pores/cm} \geq 42 \qquad \text{Eq. 3b}$$

wherein L is the minimum dimension of said article selected from its length, width, or thickness, measured in centimeters.

It is preferred that a metal comprising the inorganic hollow foam of this embodiment is selected from the group consisting of pure metals, ferrous and non-ferrous alloys, intermetallic compounds and mixtures thereof. More preferable is a metal selected from the group consisting of chromium, cobalt, copper, gold, iron, lead, manganese, molybdenum, nickel, niobium, palladium, platinum, rhodium, silver, tin, titanium, tungsten, vanadium, zinc and their alloys. Most preferred is a metal selected from the group consisting of type 316 stainless steel, alloy 17-4PH, titanium carbide, tungsten carbide, tungsten-copper alloys and molybdenum-copper alloys.

Preferably, a ceramic comprising the inorganic hollow foam of this embodiment is selected from the group consisting of carbides, oxides, nitrides, borides and silicides of metals, nonmetals, and mixtures thereof.

In a fifth embodiment, the invention is an inorganic hollow article comprising a material selected from the group consisting of a metal, a ceramic and a cermet or their combination, said article having a density at least 50% of the density of the material of which said article is composed, said article having internal walls defining a network of interconnected channels, said channels permitting the passage of fluids, and said channel volume being from 0.1% to 30% of the total volume of said article.

Preferably, the article has a density at least 75% of the density of the material of which the article is composed and the channel volume is from 0.1% to 10% of the total volume of the article.

It is preferred that a metal comprising the inorganic porous article of this embodiment is selected from the group consisting of pure metals, ferrous and non-ferrous alloys, intermetallic compounds and mixtures thereof. More preferable is a metal selected from the group consisting of chromium, cobalt, copper, gold, iron, lead, manganese, molybdenum, nickel, niobium, palladium, platinum, rhodium, silver, tin, titanium, tungsten, vanadium, zinc and their alloys. Most preferred is a metal selected from the group consisting of type 316 stainless steel, alloy 17-4PH, titanium carbide, tungsten carbide, tungsten-copper alloys and molybdenum-copper alloys.

Preferably, a ceramic comprising the inorganic porous article of this embodiment is selected from the group consisting of carbides, oxides, nitrides, borides and silicides of metals, nonmetals, and mixtures thereof.

In a sixth embodiment, the invention is an inorganic hollow mesh article selected from the group consisting of a metal mesh, a ceramic mesh and a cermet mesh, said mesh comprising a multiplicity of hollow structural members, the external surfaces of said structural members defining the boundaries of openings in said mesh.

It is preferred that a metal comprising the inorganic hollow mesh of this embodiment is selected from the group consisting of pure metals, ferrous and non-ferrous alloys, intermetallic compounds and mixtures thereof. More preferable is a metal selected from the group consisting of chromium, cobalt, copper, gold, iron, lead, manganese, molybdenum, nickel, niobium, palladium, platinum, rhodium, silver, tin, titanium, tungsten, vanadium, zinc and their alloys. Most preferred is a metal selected from the group consisting of type 316 stainless steel, alloy 17-4PH, titanium carbide, tungsten carbide, tungsten-copper alloys and molybdenum-copper alloys.

Preferably, the ceramic comprising the inorganic hollow mesh of this embodiment is selected from the group consisting of carbides, oxides, nitrides, borides and silicides of metals, nonmetals, and mixtures thereof.

In a seventh embodiment, the invention is an inorganic hollow sheet article selected from the group consisting of a hollow metal sheet, a hollow ceramic sheet, and a hollow cermet sheet, said article comprising upper and lower integrally connected sheet members, said upper and lower sheet members defining the boundaries of at least one interior open volume. The upper and lower sheet members of this article may be concentric tubes. The inorganic hollow sheet article may optionally be bonded to a substrate.

Figure 3:
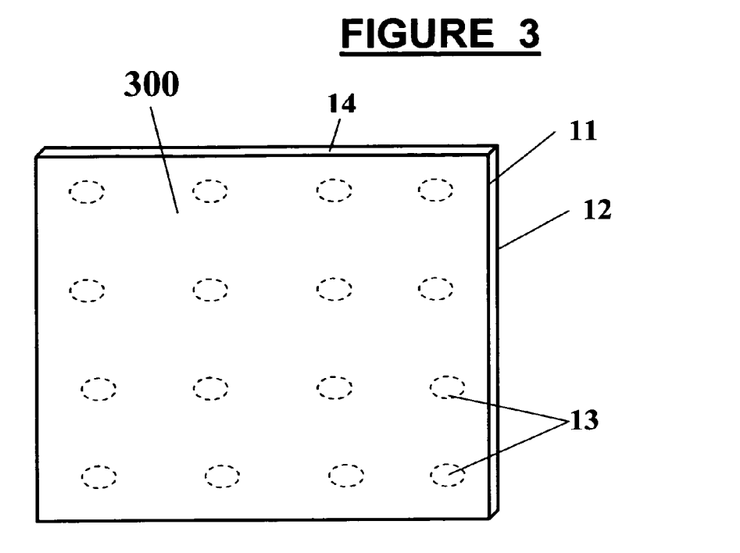
FIG. 3 is an illustration of a simple hollow sheet article of the invention.
Figures 4A, 4B:
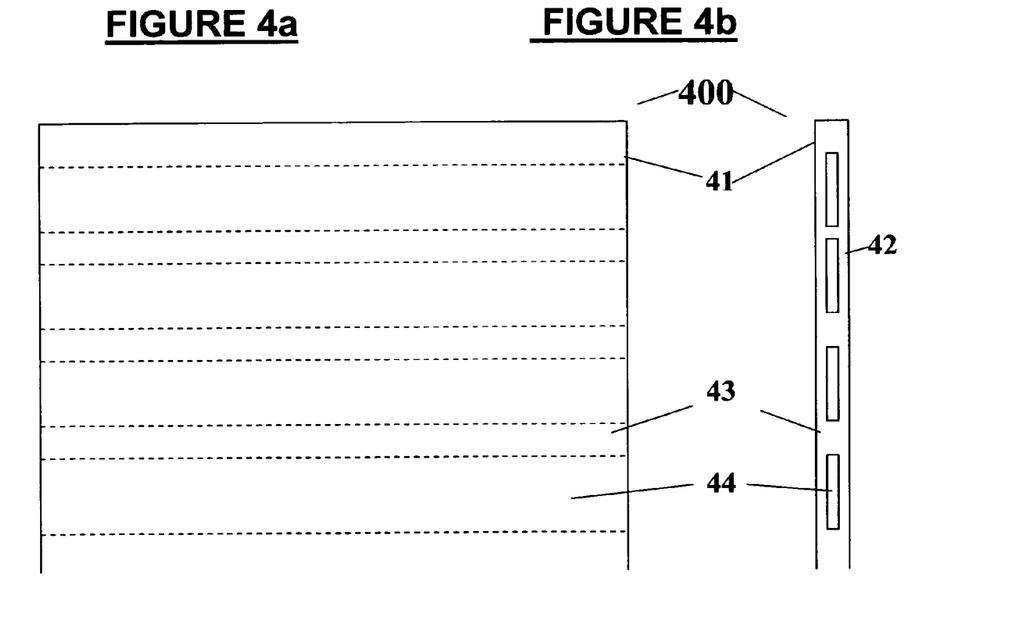
FIG. 4a illustrates a plan view of a hollow sheet article where the internal volume is divided into parallel channels.
FIG. 4b illustrates a side view of the same hollow sheet article of the invention where the internal volume is divided into parallel channels.
Figure 5:
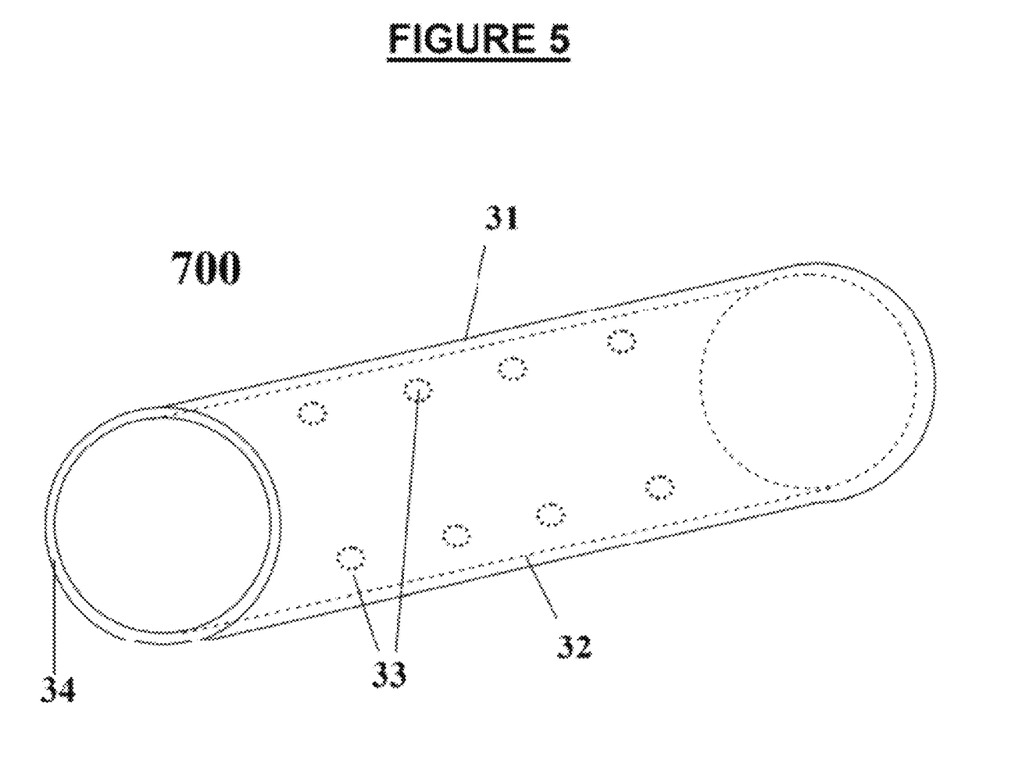
FIG. 5 is an illustration of a hollow sheet article where the upper and lower sheets are concentric tubes.

FIGS. 3, 4 and 5 illustrate three embodiments of the hollow sheet articles of the invention. The hollow sheet articles of the invention are useful as cooling jackets, heat pipes and for other applications.

It is preferred that a metal comprising the inorganic hollow sheet of this embodiment is selected from the group consisting of pure metals, ferrous and non-ferrous alloys, intermetallic compounds and mixtures thereof. More preferable is a metal selected from the group consisting of chromium, cobalt, copper, gold, iron, lead, manganese, molybdenum, nickel, niobium, palladium, platinum, rhodium, silver, tin, titanium, tungsten, vanadium, zinc and their alloys. Most preferred is a metal selected from the group consisting of type 316 stainless steel, alloy 17-4PH, titanium carbide, tungsten carbide, tungsten-copper alloys and molybdenum-copper alloys.

Preferably, a ceramic comprising the inorganic hollow sheet of this embodiment is selected from the group consisting of carbides, oxides, nitrides, borides and silicides of metals, nonmetals, and mixtures thereof.

In an eighth embodiment, the invention is an inorganic hollow fiber of comprising at least one member of the group consisting of a metal, a polycrystalline ceramic, a cermet or their mixture, said fiber having one or more inner surfaces separated by impervious walls from one another and from an outer surface, said inner surfaces defining one or more continuous longitudinal channels along the length of the fiber, said walls being of isotropic structure, and said walls having uniform composition in the radial direction.

Preferably, the inorganic hollow fiber of this embodiment is a thin wall hollow fiber having walls with a thickness of from 2 to 100 microns, preferably from 3 to 30 microns.

Preferably, the inorganic hollow fiber of this embodiment is a continuous hollow fiber of indefinite length.

It is preferred that a metal comprising the continuous inorganic hollow fiber of this embodiment is selected from the group consisting of pure metals, ferrous and non-ferrous alloys, intermetallic compounds and mixtures thereof. More preferable is a metal selected from the group consisting of chromium, cobalt, copper, gold, iron, lead, manganese, molybdenum, nickel, niobium, palladium, platinum, rhodium, silver, tin, titanium, tungsten, vanadium, zinc and their alloys. Most preferred is a metal selected from the group consisting of type 316 stainless steel, alloy 17-4PH, titanium carbide, tungsten carbide, tungsten-copper alloys and molybdenum-copper alloys.

Preferably, a polycrystalline ceramic comprising the continuous inorganic hollow fiber of this embodiment is selected from the group consisting of carbides, oxides, nitrides, borides and silicides of metals, nonmetals, and mixtures thereof.

In a ninth embodiment, the invention is a method of making a metal foil comprising the steps:
- a) coating one surface of a substrate with an aqueous slurry comprising a gel forming binder and a metal powder, said slurry being applied at a temperature above its gelation temperature and having a viscosity less than or equal to 0.4 Pa-sec at the application temperature;
- b) cooling said slurry to a temperature below its gelation temperature to form a gel;
- c) substantially drying the gel to form a green foil body;
- d) optionally, separating the green foil body from the substrate;
- e) heating the green foil body for periods of times, at temperatures, and in atmospheres sufficient to sinter the green foil body into body into a dense metal foil, and optionally to vaporize the substrate.

It is preferred that the metal comprising the foil of this embodiment is selected from the group consisting of pure metals, ferrous and non-ferrous alloys, intermetallic compounds and mixtures thereof. More preferable is a metal selected from the group consisting of chromium, cobalt, copper, gold, iron, lead, manganese, molybdenum, nickel, niobium, palladium, platinum, rhodium, silver, tin, titanium, tungsten, vanadium, zinc and their alloys. Most preferred is a metal selected from the group consisting of type 316 stainless steel, alloy 17-4PH, titanium carbide, tungsten carbide, tungsten-copper alloys and molybdenum-copper alloys.

In a tenth embodiment, the invention is a method of making an inorganic coating on an inorganic substrate comprising the steps:
- a) coating at least one surface of said substrate with an aqueous slurry comprising a gel forming binder and least one member of the group consisting of a ceramic powder, a metal powder, a cermet powder, carbon nanontubes, metal whiskers, ceramic whiskers, or their mixture to form a coating on the substrate, said slurry being applied at a temperature above its gelation temperature and having a viscosity less than or equal to 0.4 Pa-sec at the application temperature;
- b) optionally, removing excess slurry from the substrate;
- c) cooling said slurry to a temperature below its gelation temperature;
- d) substantially drying the coated substrate;
- e) heating the coated substrate for periods of times, in atmospheres, and at temperatures below the melting point of said substrate sufficient to sinter the coating and the substrate into a unitary article.

It is preferred that a metal comprising the inorganic coating of this embodiment is selected from the group consisting of pure metals, ferrous and non-ferrous alloys, intermetallic compounds and mixtures thereof. More preferable is a metal selected from the group consisting of chromium, cobalt, copper, gold, iron, lead, manganese, molybdenum, nickel, niobium, palladium, platinum, rhodium, silver, tin, titanium, tungsten, vanadium, zinc and their alloys. Most preferred is a metal selected from the group consisting of type 316 stainless steel, alloy 17-4PH, titanium carbide, tungsten carbide, tungsten-copper alloys and molybdenum-copper alloys.

Preferably, a ceramic comprising the inorganic coating of this embodiment is selected from the group consisting of carbides, oxides, nitrides, borides and silicides of metals, nonmetals, and mixtures thereof.

The following examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1

316 Stainless Steel Hollow Foam

An open cell polyurethane foam block (Grade: Ultrafine) was obtained from E.N. Murray Co., Denver, Colo. having a pore density of 43.3 pores/cm. The interior and exterior surfaces of the foam block were coated with an aqueous slurry of 316 stainless steel powder in the following manner:

A 3.85 wt. % solution of gelatin (Type A Gelatin supplied by Gelita North America, Sergeant Bluff, Iowa) was prepared at 30° C. in water containing 0.0032 wt. % of potassium sorbate as a biocide. The gelation temperature of this solution was 23° C. Stainless steel powder, type 316 having an average particle size of 3 microns (Grade PF-3F, Epson Atmix Corporation, Aomori-ken, Japan and distributed by U.S. Bronze Co., Flemington, N.J.) was added to this solution along with a small amount of a silicone defoaming agent (Grade C-2290 New London Distributors, Inverness, Ill.) with vigorous stirring to produce a homogeneous slurry. The composition of the slurry was 76.218 wt. % 316 stainless steel powder, 0.915 wt. % gelatin, 0.0015 wt. % potassium sorbate, 0.0004 wt. % defoaming agent and 22.8651 wt. % water. The viscosity of the slurry was 0.03 Pa-s at 25° C. The foam block was immersed in the coating slurry for several seconds coating the outside and inside surfaces. Excess slurry was removed by squeezing and then by blowing with air. During removal of the excess slurry, cooling of the foam block to room temperature (~21° C.) caused the slurry to gel. The coated foam block was air-dried for several hours at room temperature.

The dried coated foam block was then transferred to an oven and subjected to the time and temperature schedule in Table II. The times, and temperatures in the ambient atmospheres were sufficient to vaporize the polyurethane substrate to form a green hollow article, and then sufficient to sinter the stainless steel powder into a unitary article. An article of the invention was formed having dimensions of 5.1 cm×5.1 cm×2.54 cm, a pore density of 43.3 pores/cm and dense, thin wall, hollow 316 stainless steel structural members with interior surfaces having essentially the initial form of the vaporized substrate. The carbon content of the stainless steel was less than 12 parts per million.

The article of the invention satisfied the inequality of Equation 1 as follows:

$$(55 - 8.27L) \leq \text{Pores/cm} \leq (140 - 8.27L) \quad \text{Eq. 1}$$

$$(55 - 8.27 \times 2.54) \leq 43.3 \leq (140 - 8.27 \times 2.54)$$

$$33 \leq 43.3 \leq 119$$

TABLE II

Time and Temperature Schedule for Vaporization of the Polymer Substrate and Sintering of the Stainless Steel Powder

| Temperature, ° C. | Heating or Cooling Rate, ° C./hr | Time, hrs | Atmosphere |
|---|---|---|---|
| 25-500 | 200 | 2.38 | nitrogen |
| 500 | hold | 1.0 | hydrogen |
| 500-850 | 200 | 1.75 | hydrogen |
| 850 | hold | 0.5 | hydrogen |
| 850-1330 | 150 | 3.2 | hydrogen |
| 1330 | hold | 1.0 | hydrogen |
| 1330-1000 | 200 | 1.15 | hydrogen |
| 1000 | hold | 0.03 | hydrogen |
| 1000-25 | 200 | 4.88 | hydrogen |

Example 2

17-4 PH Stainless Steel Hollow Foam

Example 1 was repeated using the same polyurethane foam and the same slurry composition except that the metal powder was 17-4 PH stainless steel having an average particle size of 8 microns (Epson Atmix Corporation, Aomori-ken, Japan). An article of the invention was formed having dimensions of 5.1 cm×5.1 cm×2.54 cm, a pore density of 43.3 pores/cm and dense, thin wall, hollow 17-4 PH stainless steel structural members with interior surfaces having essentially the initial form of the vaporized substrate. The article of the invention satisfied the inequality of Equation 1.

Example 3

Nickel Hollow Foam

Example 1 was repeated using the same polyurethane foam and the same slurry composition except that the metal powder was nickel powder having an average particle size of 3 microns (type 210H, from Novamet, Wyckoff, N.J.). The same process was followed to coat, to remove excess slurry and to dry the coated foam. The dried coated foam block was then transferred to an oven and subjected to the time and temperature schedule in Table III. The times, and temperatures in the ambient atmospheres were sufficient to vaporize the polyurethane substrate to form a green hollow article, and then sufficient to sinter the nickel powder into a unitary article. An article of the invention was formed having dimensions of 5.1 cm×5.1 cm×2.54 cm, a pore density of 43.3 pores/cm and dense, thin wall, hollow nickel structural members with interior surfaces having essentially the initial form of the vaporized substrate. The article of the invention satisfied the inequality of Equation 1.

TABLE III

Time and Temperature Schedule for Vaporization of the Polymer Substrate and Sintering of the Nickel Powder

| Temperature, ° C. | Heating or Cooling Rate, ° C./hr | Time, hrs | Atmosphere |
|---|---|---|---|
| 25-500 | 200 | 2.38 | nitrogen |
| 500 | hold | 2.0 | hydrogen |
| 500-900 | 200 | 1.80 | hydrogen |
| 900 | hold | 0.5 | hydrogen |
| 900-1300 | 150 | 2.67 | hydrogen |

TABLE III-continued

Time and Temperature Schedule for Vaporization of the Polymer Substrate and Sintering of the Nickel Powder

| Temperature, ° C. | Heating or Cooling Rate, ° C./hr | Time, hrs | Atmosphere |
|---|---|---|---|
| 1300 | hold | 1.0 | hydrogen |
| 1300-1000 | 200 | 1.5 | hydrogen |
| 1000 | hold | 0.03 | hydrogen |
| 1000-25 | 200 | 4.88 | hydrogen |

Example 4

Thick 316 Stainless Steel Hollow Foam

Example 1 is repeated using a block of the same polyurethane foam but having twice the thickness of Example 1. An article of the invention is formed having dimensions of 10.3 cm×10.3 cm×10.3 cm, a pore density of 43.3 pores/cm and hollow 316 stainless steel structural members with interior surfaces having essentially the initial form of the vaporized substrate. The article of the invention satisfies the inequality of Equation 1 as follows:

$$(55 - 8.27L) \leq \text{Pores/cm} \leq (140 - 8.27L) \quad \text{Eq. 1}$$
$$(55 - 8.27 \times 10.3) \leq 43.3 \leq (140 - 8.27 \times 10.3)$$
$$-30.2 \leq 43.3 \leq 54.8.$$

Example 5

High Pore Density 316 Stainless Steel Hollow Foam

An open cell melamine-formaldehyde foam block, grade PMF-100, was obtained from Polymer Technologies Inc., Newark, Del. having a pore density of 86.6 pores/cm. The interior and exterior surfaces of the foam block were coated with the same aqueous slurry of 316 stainless steel powder as described in Example 1 by immersion in the slurry for several minutes. Excess slurry was removed by centrifugation and the coated foam block was dried and subjected to the same time and temperature schedule as described in Example 1.

An article of the invention was formed having dimensions of 5.1 cm×5.1 cm×2.54 cm, a pore density of 86.6 pores/cm and thin wall hollow 316 stainless steel structural members with interior surfaces having essentially the initial form of the vaporized substrate. The article of the invention satisfied the inequality of Equation 1 as follows:

$$(55 - 8.27L) \leq \text{Pores/cm} \leq (140 - 8.27L) \quad \text{Eq. 1}$$
$$(55 - 8.27 \times 2.54) \leq 86.6 \leq (140 - 8.27 \times 2.54)$$
$$33 \leq 86.6 \leq 119$$

Example 6

Continuous 316 Stainless Steel Hollow Foam

A slurry is continuously prepared in a mixing vessel 100 as illustrated schematically in FIG. 1. The composition of the slurry is 76.218 wt. % 316 stainless steel powder, 0.915 wt. % gelatin, 0.0015 wt. % potassium sorbate, 0.0004 wt. % defoaming agent and 22.8651 wt. % water. The viscosity of the slurry is 0.03 Pa-s at 25° C. The gelation temperature of the slurry is 23° C. The slurry 40 passes into an immersion tank 110 under level control to maintain the level in the immersion tank. A continuous length of polyurethane foam 300 having a pore density of 43.3 pores/cm is passed into the immersion tank 110 and is totally immersed in the slurry. The polyurethane foam 350 issuing from the immersion tank has its exterior surface and interior surfaces coated by the slurry. The coated polyurethane foam passes under an air knife 120 fed by air stream 60 that removes excess slurry and cools the coating to beneath the gel point temperature. The coated polyurethane foam is passed into an oven 135 where it is dried by an air stream 70, 72 at a temperature of 95° C. The dried-coated polyurethane foam 400 is then collected as a continuous roll of indefinite length.

At a later time, the above roll of dried-coated polyurethane foam 400 is fed into a multi-compartment oven 140. The first oven compartment is maintained at a temperature of 500° C. in a nitrogen flow 80, 82. Residence time of the coated polyurethane foam in this oven compartment is one hour during which time the polyurethane foam is vaporized leaving a porous green body with hollow structural members. The porous green body passes continuously through this oven compartment through a seal into a second oven compartment maintained at a temperature of 1330° C. in a hydrogen flow 85, 87 of about ten liters/hr. Residence time of the green body in this compartment is one hour during which time the porous green body is sintered into a unitary article. The sintered article is passed into a third oven compartment where it is cooled to 300° C. in a nitrogen flow 90, 92. Issuing from the third oven compartment is a continuous hollow article of indefinite length, 30 cm wide by 2.54 cm thick, having hollow, impervious structural members and a pore density of 43.3 pores/cm; the interior spaces of the structural members having the shape of the vaporized polyurethane foam.

Example 7

High Pore Density Alumina Hollow Foam

Alumina ($Al_2O_3$) powder having an average particle size of about 11 microns designated Alcan C-90 was obtained from Alcan Inc., Montreal, Quebec, Canada. 75.0 wt. % of the alumina powder was mixed with 24.5 wt. % water and 0.5 wt. % Darvan 821A dispersant from R.T. Banderbilt Co. Norwalk, Conn. and milled in a milling jar with a polyurethane liner containing half inch cylindrical alumina milling media. The viscosity of this mixture was measured as a function of milling time as shown in Table IV below.

TABLE IV

| Milling Time (hr.) | Viscosity (Pa-s) |
|---|---|
| 6.25 | 0.0082 |
| 12 | 0.0075 |
| 15 | 0.079 |
| 18 | 0.0074 |
| 21 | 0.0075 |
| 24 | 0.008 |
| 24.5 | 0.0099 |
| 25 | 0.011 |
| 25.5 | 0.0153 |
| 26 | 0.0188 |

At the end of 26 hours of milling, the average particle size of the alumina powder was 1 micron. A homogeneous coating slurry was formed from this milled alumina slurry by mixing 98.7981 wt. % of the milled alumina slurry with 1.2 wt. % gelatin, 0.001 wt % potassium sorbate, and 0.0004 wt. % defoaming agent. The viscosity of the slurry was 0.022 Pa-s at 27° C. The gelation temperature of this slurry was 23° C.

A block of the open cell melamine-formaldahyde foam described in Example 5 having a pore density of 86.6 pores/cm was immersed in this alumina slurry for several minutes. The interior and exterior surfaces of the foam block were thereby coated. Excess slurry was removed by centrifugation and the coated foam block was dried and subjected to the time and temperature schedule shown in Table V.

TABLE V

Time and Temperature Schedule for Vaporization of the Polymer Substrate and Sintering of the Alumina Powder

| Temperature, ° C. | Heating or Cooling Rate, ° C./hr | Time, hrs | Atmosphere |
|---|---|---|---|
| 25-500 | 200 | 2.38 | air |
| 500 | hold | 1.0 | air |
| 500-900 | 200 | 2.0 | air |
| 900 | hold | 0.5 | air |
| 900-1550 | 150 | 4.33 | air |
| 1550 | hold | 1.5 | air |
| 1550-25 | 200 | 7.62 | air |

The times, and temperatures in the ambient atmospheres were sufficient to vaporize the melamine-formaldehyde substrate to form a green hollow article, and then sufficient to sinter the alumina powder into a unitary article. An article of the invention was formed having dimensions of 5.1 cm×5.1 cm×2.54 cm, a pore density of 86.6 pores/cm and dense, thin wall, hollow alumina structural members with interior surfaces having essentially the initial form of the vaporized substrate. The article of the invention satisfied the inequality of Equation 1 as follows:

$$(55 - 8.27L) \leq \text{Pores/cm} \leq (140 - 8.27L) \quad \text{Eq. 1}$$

$$(55 - 8.27 \times 2.54) \leq 86.6 \leq (140 - 8.27 \times 2.54)$$

$$33 \leq 86.6 \leq 119$$

Example 8

Microchannels in Block of 316 Stainless Steel

Example 1 was repeated using a 1 cm×1 cm×1 cm block of the same polyurethane foam and the same 316 stainless steel slurry composition. The foam was immersed in the slurry, squeezed and then immersed again. After the second immersion, the slurry that filled the pore cavities of the foam was not removed. The slurry-filled foam was dried at room temperature for 24 hours. The dried coated foam block was then transferred to an oven and subjected to the time and temperature schedule in Table VI. The times, and temperatures in the ambient atmospheres were sufficient to vaporize the polyurethane substrate to form a green hollow article, and then sufficient to sinter the stainless steel powder into a unitary article.

TABLE VI

Time and Temperature Schedule for Vaporization of the Polymer Substrate and Sintering of the Stainless Steel Powder

| Temperature, °C. | Heating or Cooling Rate, °C./hr | Time, hrs | Atmosphere |
|---|---|---|---|
| 25-500 | 200 | 2.38 | nitrogen |
| 500 | hold | 1.0 | hydrogen |
| 500-900 | 200 | 2.0 | hydrogen |
| 900 | hold | 0.5 | hydrogen |
| 900-1315 | 150 | 2.77 | hydrogen |
| 1315 | hold | 1.0 | hydrogen |
| 1315-1000 | 200 | 1.15 | hydrogen |
| 1000 | hold | 0.03 | hydrogen |
| 1000-25 | 200 | 4.88 | hydrogen |

A specimen article of the invention was formed having a density 50% of that of solid 316 stainless steel and having a 3-dimensional network of interconnected channels. When the specimen was placed in a shallow pool of water containing red dye, drops of the red colored water appeared within seconds on its top surface showing that the channels permitted the passage of fluids. Measurements of the dry weight of the article and the weight when filled with liquid showed the channel volume to be 9.2% of the total volume of the article. Electric discharge machining of a surface of the specimen and examination by electron microscopy showed the interconnected network of channels; the entrance holes of the channels having the same triangular shape as the precursor polyurethane foam ligaments.

This embodiment of the invention is useful as a filter among other applications.

Example 9

Microchannels in Block of 316 Stainless Steel

An open cell melamine-formaldehyde foam block, grade PMF-100, was obtained from Polymer Technologies Inc., Newark, Del. having dimensions of 0.7 cm×1 cm×2 cm and a pore density of 86.6 pores/cm. The foam block was totally immersed for several minutes in the same aqueous slurry of 316 stainless steel powder as described in Example 1. The slurry-filled foam was dried at room temperature for 24 hours. The dried coated foam block was then transferred to an oven and subjected to the time and temperature schedule in Table II. The times, and temperatures in the ambient atmospheres were sufficient to vaporize the melamine-formaldehyde substrate to form a green hollow article, and then sufficient to sinter the stainless steel powder into a unitary article.

The edges of the article were machined using an electric discharge method (EDM) exposing a network of interconnecting channels. The resulting block had dimensions of 0.615 cm×0.8 cm×1.03 cm, a volume of 0.5068 cc and weighed 3.695 g. The block density of 7.29 g/cc was 91.1% of the density of solid 316 stainless steel.

When the specimen was placed in a shallow pool of water containing red dye, drops of the red colored water appeared within seconds on its top surface showing that the channels permitted the passage of fluids. Measurements of the dry weight of the article and the weight when filled with liquid showed the channel volume to be 0.32% of the total volume of the article.

Example 10

316 and 17-4PH Stainless Steel Microtubes

Nylon 6 monofilaments with various cross-sections, e.g., trilobal, hexa-lobal, hexagonal and round, were spun and collected. Lengths of the fibers were coated with either the 316 stainless steel slurry described in Example 1, or with the 17-4 PH slurry described in Example 2, by drawing the filaments through a bath of the slurry. Excess slurry was removed from the fibers by blowing with air and the coated fibers were dried at 25° C. for two hours. The coated and dried fibers were transferred to an oven and subjected to the time and temperature schedule shown in Table I above. The times, and temperatures in the ambient atmospheres were sufficient to vaporize the nylon fibers to form a green hollow article, and then sufficient to sinter the stainless steel powders into unitary thin wall hollow tubes with cross-sections having the same shape as the precursor nylon fibers. The walls of the tubes were impervious, isotropic in structure, and of uniform composition in the radial direction.

Figure 2:
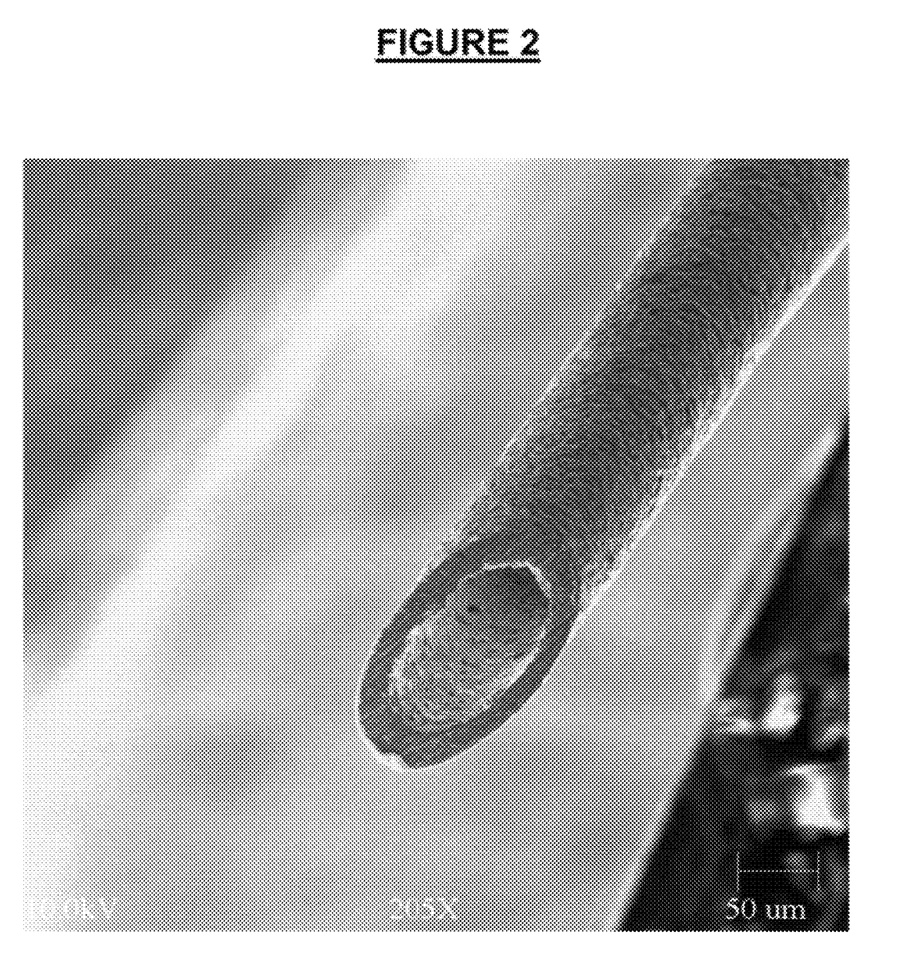
FIG. 2 is photomicrograph of a hollow fiber of the invention.

Scanning electron microscopy measurements of a 316 stainless steel tube of the invention with a round cross-section showed its dimensions to be 70 microns in inside diameter, 100 microns in outside diameter with a wall thickness of 15 microns (FIG. 2).

The microtubes of the invention are useful as body implant devices among other applications.

Example 11

Continuous Multi-Channel Stainless Steel Fiber

A continuous nylon 6 yarn is spun consisting of twenty-four filaments of indefinite length and round cross-sections. The yarn is continuously coated with the 316 stainless steel slurry described in Example 6 and is dried, heated and sintered by the process described in Example 6 and as illustrated schematically in FIG. 1.

The unitary sintered fiber Issuing from the process is a continuous hollow 316 stainless steel fiber of indefinite length having twenty-four continuous longitudinal channels separated by impervious structural walls having an isotropic structure, the channels having the cross-sectional shape of the vaporized nylon filaments and the walls having uniform composition in the radial direction.

Example 12

Multi-channel Alumina Fiber

A length of polyester yarn consisting of 3200 twenty-five micron diameter filaments was coated on all surfaces with an alumina slurry having the same composition as in Example 7. The coated yarn was air dried, placed in an oven and subjected to the oven temperatures and atmospheres shown in Table V.

The unitary sintered fiber Issuing from the oven was a hollow alumina fiber having an external diameter of 2.95 mm and having 3200 longitudinal channels along its length. The channels were separated by impervious structural walls of isotropic structure and uniform structure in the radial direction, and having the cross-sectional shape of the vaporized polyester filaments.

Example 13

316 Stainless Steel Foils

The same 316 stainless steel slurry as described in Example 1 was coated onto substrates consisting of a nylon hydrophilic polymer and dried at 25° C. for three hours. The slurry coatings were applied at different thickness'. The dried coatings were separated from the substrates, placed in an oven and heated and sintered under the conditions shown in Table II. The thickness' of sintered stainless steel foils so produced were from 25 to 250 microns. The foils had more than 95% of the theoretical density of 316 stainless steel.

Example 14

316 Stainless Steel Coating on an Alumina Substrate

The same 316 stainless steel slurry as described in Example 1 was coated onto a substrate consisting of 3 cm×3 cm×1 mm fully dense alumina plate and dried at 25° C. for three hours. The coated alumina substrate was placed in an oven and heated and sintered under the conditions shown in Table II. A unitary article was produced consisting of a 316 stainless steel coating on an alumina plate.

Example 15

Copper Foils

Example 13 was repeated using the same slurry composition except that the metal powder was copper having an average particle size of 5 microns (Grade MIM 3123, UltraFine Techology Inc., Woonsocket, R.I.). The slurry coatings were applied at different thickness'. The dried coatings were separated from the hydrophilic polymer substrates, placed in an oven and heated and sintered under the conditions shown in Table VII. The thickness' of sintered copper foils so produced were from 15 to 100 microns. The foils had more than 95% of the density of copper.

TABLE VII

Time and Temperature Schedule for Sintering the Copper Powder

| Temperature, ° C. | Heating or Cooling Rate, ° C./hr | Time, hrs | Atmosphere |
| --- | --- | --- | --- |
| 25-500 | 200 | 2.38 | nitrogen |
| 500 | hold | 1.0 | hydrogen |
| 500-850 | 200 | 1.75 | hydrogen |
| 850 | hold | 0.5 | hydrogen |
| 850-1330 | 150 | 2.4 | hydrogen |
| 1330 | hold | 1.0 | hydrogen |
| 1315-1000 | 200 | 1.575 | hydrogen |
| 1000 | hold | 0.03 | hydrogen |
| 1000-25 | 200 | 4.88 | hydrogen |

Example 16

Tungsten/10% Copper Foils

Example 13 was repeated using the same slurry composition except that the metal powder was a mixture consisting of 90 wt. % tungsten powder having an average particle size of 5 microns (grade: C10 from Buffalo Tungsten Inc., Depew, N.Y.) and 10 wt. % of the same copper powder as in Example 15. The slurry coatings were applied at different thickness'. The dried coatings were separated from the hydrophilic polymer substrates, placed in an oven and heated and sintered under the conditions shown in Table VIII. The foils had more than 96.5% of the theoretical density of tungsten/10% copper. The theoretical density of the mixture is defined as follows:

$$\rho_{Theor.} = x_W \rho_W + x_{Cu} \rho_{Cu}$$

where: $\rho_W$, $P_{Cu}$ are the densities of pure tungsten and pure copper $X_W$, $X_{Cu}$ are the weight fractions of tungsten and copper.

TABLE VIII

Time and Temperature Schedule for Sintering the Tungsten/10% Copper Powder

| Temperature, ° C. | Heating or Cooling Rate, ° C./hr | Time, hrs | Atmosphere |
| --- | --- | --- | --- |
| 25-500 | 200 | 2.38 | nitrogen |
| 500 | hold | 1.0 | hydrogen |
| 500-900 | 200 | 2.0 | hydrogen |
| 900 | hold | 0.5 | hydrogen |
| 900-1315 | 150 | 2.77 | hydrogen |
| 1315 | hold | 1.0 | hydrogen |
| 1315-1000 | 200 | 1.58 | hydrogen |
| 1000 | hold | 0.03 | hydrogen |
| 1000-25 | 200 | 4.88 | hydrogen |

Example 17

Tungsten/20% Copper Foils

Example 15 was repeated using the same slurry composition except that the metal powder was a mixture consisting of 80 wt. % tungsten powder and 20 wt. % copper powder using the same tungsten and copper powders as in Example 15. The slurry coatings were applied at different thickness'. The dried coatings were separated from the hydrophilic polymer substrates, placed in an oven and heated and sintered under the same conditions as shown in Table VIII. The foils had more than 97% of the theoretical density of tungsten/20% copper.

Example 18

Simple Hollow Sheet

A nylon-6 sheet substrate having dimensions of 10 cm×10 cm×0.05 cm and several rows of 1 mm perforations along its length is coated by immersion in the same 316 stainless steel slurry as described in Example 1. The perforations are also filled by the slurry. The sheet is air dried at 20° C. for several hours and then placed in an oven where it is subjected to the same time and temperature schedule as shown in Table II. The times, and temperatures in the ambient atmospheres are sufficient to vaporize the nylon substrate to form a green hollow article, and then sufficient to sinter the stainless steel powder into a unitary article. As illustrated in FIG. 3, a hollow 316 stainless steel sheet article of the invention 300 is formed consisting of an upper sheet member 11 and a lower sheet member 12 integrally connected by stainless steel columns 13 where the perforations existed in the nylon sheet, the upper and lower sheet members defining the boundaries of an open interior volume 14 having the shape of the vaporized substrate.

The hollow sheet is useful as a cooling jacket among other applications.

Example 19

Hollow Sheet Article Having Internal Channels

Four nylon-6 sheet strips having dimensions of 10 cm×1 cm×0.05 cm are placed parallel to each other in a shallow box of dimensions 10 cm×10 cm×0.15 cm made of a hydrophilic material. The strips are placed at spacings of 1 cm from each other. The box is filled with the same 316 stainless steel slurry as described in Example 1 completely surrounding the nylon strips. The slurry is substantially dried at 20° C. and the resulting article is placed in an oven where it is subjected to the same time and temperature schedule as shown in Table II. The times, and temperatures in the ambient atmospheres are sufficient to vaporize the nylon strips to form a green hollow article, and then sufficient to sinter the stainless steel powder into a unitary sheet article. As illustrated in FIGS. 4*a* and 4*b*, a hollow 316 stainless steel sheet article of the invention 400 is formed consisting of the upper 41 and lower members of the sheet 42 connected at two of their edges and by stainless steel spacers 43, the upper and lower sheet members defining an internal volume 44 having the shape of the vaporized nylon strips.

Example 20

Hollow Sheet Article Having Sets of Perpendicular Interconnected Channels

A plain weave nylon fabric having a thread count of 67 threads/cm in both warp and woof directions was cut into a square having dimensions of 10×10 cm. The fabric square was placed in a shallow box and covered with the same 316 stainless steel slurry as described in Example 1 completely surrounding the fabric square and filling the spaces between the threads. The slurry was substantially dried at 20° C. and the resulting article was placed in an oven where it was subjected to the same time and temperature schedule as shown in Table II. The times, and temperatures in the ambient atmospheres were sufficient to vaporize the nylon fabric to form a green hollow article, and then sufficient to sinter the stainless steel powder into a unitary sheet article.

Figure 6:
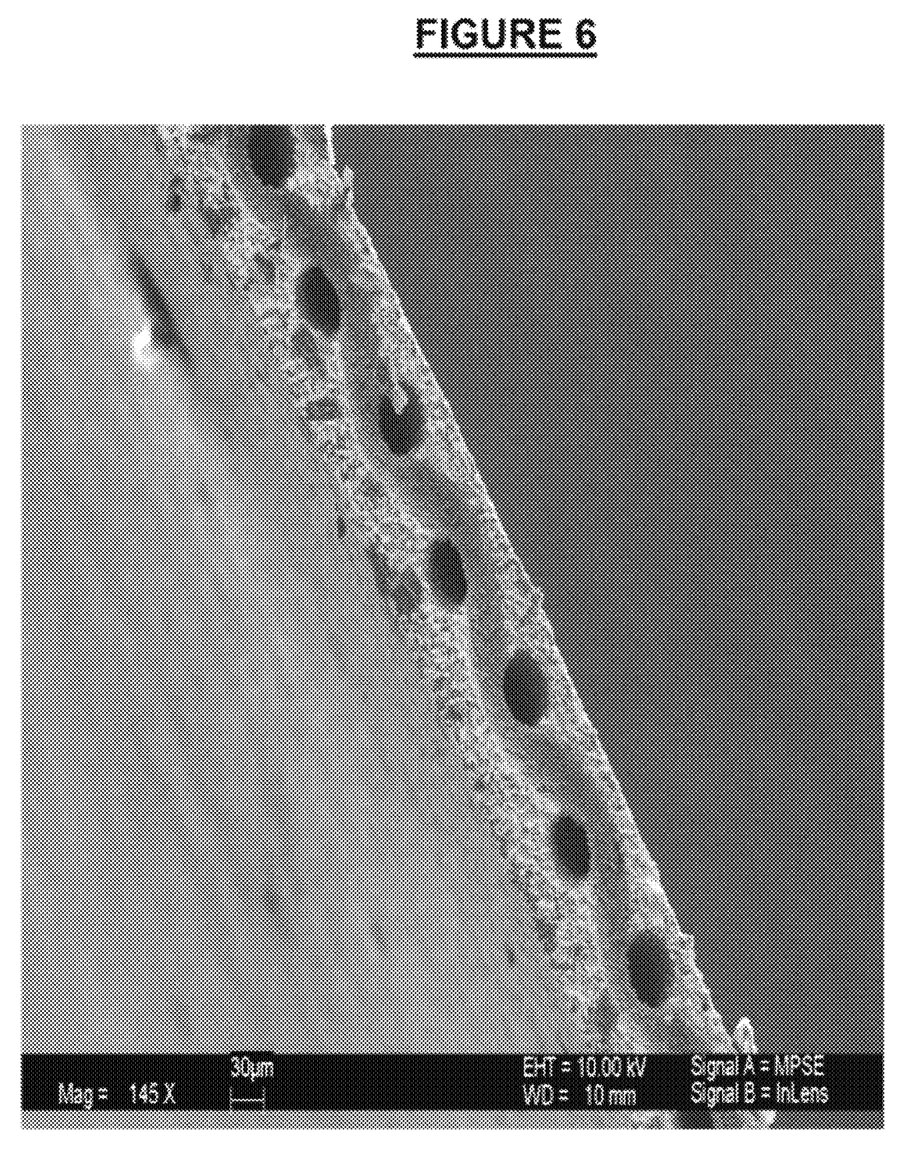
FIG. 6 is a photomicrograph of a hollow sheet article having two non-intersecting sets of multiple internal channels running in directions generally perpendicular to each other.

A photomicrograph of a cross-section of this article of the invention is shown in FIG. 6 along a plane that includes an axis of one of the fibers. It is seen that the article has two sets of interconnected internal channels that lie in generally perpendicular directions.

The article of the invention is useful as a heat exchanger among other applications.

Example 21

Hollow Sheet Article Comprising Concentric Tubes

A nylon-6 tube having an inside diameter of 9 mm, an outside diameter of 10 mm and a length of 30 cm and several rows of 1 mm perforations along its length is coated on its inside surface, and its outside surface by immersion in the same 316 stainless steel slurry as described in Example 1. The perforations are also filled by the slurry. The coated tube is air dried at for several hours at 25° C. and placed in an oven where it is subjected to the same time and temperature schedule as shown in Table II. The times, and temperatures in the ambient atmospheres are sufficient to vaporize the nylon tube to form a green hollow article, and then sufficient to sinter the stainless steel powder into a unitary article. As illustrated in FIG. 4, a hollow 316 stainless steel sheet article 700 of the invention is formed consisting of an upper sheet member 31 and a lower sheet member 32 integrally connected by stainless steel columns 33 where the perforations existed in the nylon tube, the upper and lower sheet members defining the boundaries of an open interior volume 34 having the shape of the vaporized nylon tube Example 21

Open nylon-6 monofilament square mesh fabrics having various mesh openings and filament thickness' were obtained from Sefar America, Depew, N.Y. The mesh openings varied from 500 to 1000 microns and the monofilament diameters varied from 60 microns to 300 microns. The meshes were dip coated with the 316 stainless steel slurry as described in Example 1. Excess slurry was removed from the meshes by blowing with a gentle air flow to clear the openings between the monofilaments. The coated meshes were dried and sintered as described in Example 1 and Table II. Hollow stainless steel meshes were produced comprising a multiplicity of hollow structural members, the external surfaces of the structural members defining the boundaries of openings in the meshes, and the internal surfaces of the structural members having the shape of the vaporized nylon meshes.

Having thus described the invention in rather full detail, it will be understood that such detail need not be strictly adhered to but that further changes, modifications and uses may suggest themselves to one skilled in the art, all falling within the scope of the invention as defined by the subjoined claims.

What is claimed is:
1. A method for making a hollow article, said hollow article having:
    an upper surface, and a lower surface;
    a left surface and a right surface;
    a proximal surface and a distal surface;
    at least one pair of opposing surfaces of said article having one or more openings to un-branched channels, said channels running completely through the interior of said article directly from one opposing surface to the other;
said method comprising the steps:
    a) selecting a polymeric substrate from the group consisting of a filament, a plurality of essentially parallel filaments, a woven fabric sheet, a knitted fabric sheet, a non-woven fabric sheet, a mesh, a film, and a sheet, said polymeric substrate having exterior surfaces and optionally having interior surfaces;
    b) coating said exterior and interior surfaces, if any, of said substrate with an aqueous slurry comprising a gel forming binder and inorganic particles, said inorganic particles being at least one member of the group consisting of a ceramic powder, a metal powder, a cermet powder, carbon nanotubes, metal whiskers, ceramic whiskers, and their mixture to form a coated article, said slurry being applied at a temperature above its gelation temperature and having a viscosity less than or equal to 0.4 Pa-sec at the application temperature;
    c) optionally, removing excess slurry from the coated article
    d) cooling said slurry to a temperature below its gelation temperature:
    e) substantially drying the coated article;
    f) optionally repeating steps b) through e) one or more times;
    g) heating the coated article for periods of times, at temperatures and in atmospheres sufficient to vaporize the polymeric substrate forming a green hollow article;
    h) sintering the green hollow article in a protective atmosphere under conditions of time and temperatures as are required to cohere the inorganic particles into a unitary hollow article having hollow structural members with interior surfaces having essentially the initial form of the vaporized substrate.

2. The method of making a hollow article of claim 1, further comprising wherein at least one pair of opposing surfaces having no openings.

\* \* \* \* \*